Oct. 31, 1933.   C. G. SUITS ET AL   1,933,351
TESTING APPARATUS
Filed July 25, 1931

Inventors:
Chauncey G. Suits,
Albert W. Hull,
by Charles E. Sullar.
Their Attorney.

Patented Oct. 31, 1933

1,933,351

UNITED STATES PATENT OFFICE 1,933,351

TESTING APPARATUS

Chauncey G. Suits and Albert W. Hull, Schenectady, N. Y., assignors to General Electric Company, a corporation of New York Application July 25, 1931. Serial No. 553,125

8 Claims. (Cl. 175—183)

Our invention relates to testing apparatus and particularly to apparatus for making a continuous test of the magnetic properties of a long length of material, or a long series of samples. It is the object of our invention to provide an improved apparatus of this character whereby differences may be detected in samples of magnetic material and the samples selected or discriminated against automatically in a continuous manner.

Our invention will be better understood from the following description taken in connection with the accompanying drawing, and its scope will be pointed out in the appended claims.

Figure 1:
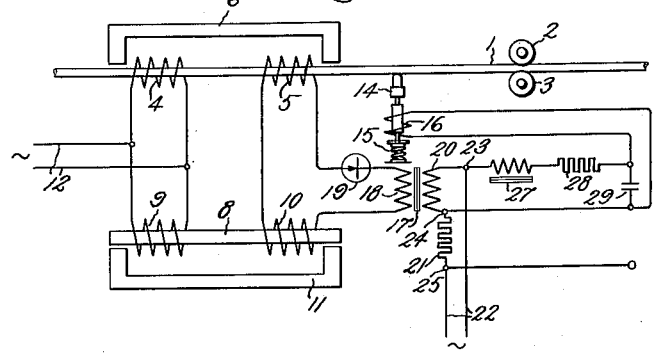
Figure 2:
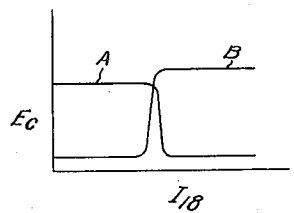

Referring to the drawing, Fig. 1 illustrates one embodiment of apparatus and circuit connections thereto involving our invention; and Fig. 2 shows response curves of the apparatus shown in Fig. 1.

In the drawing, the material to be tested is shown at 1 in the form of a rod or wire and by means of the rolls 2 and 3 is caused to advance with a uniform speed. Surrounding the material 1 are two coils 4 and 5 which with the material 1 constitute a transformer, coil 4 being the primary winding and coil 5 the secondary winding. To complete the magnetic circuit we have shown the magnetic member 6 whose ends lie close to the material 1. If desired the windings 4 and 5 may be arranged one upon the other and these windings also may be arranged on the member 6 in cases where it is not desirable to pass the material to be tested through the windings. The core structure 8 which constitutes a basis of comparison is shown having upon it the coils 9 and 10 which like coils 4 and 5 constitute the primary and secondary windings of a second transformer. Magnetic member 11 similar to member 6, serves to complete the magnetic circuit of the core 8. The two primary windings 4 and 9 are connected to a suitable alternating current source by the leads 12. If the magnetic properties of the material 1 being tested are like those of the core structure 8, the induced electromotive forces in the two secondaries 5 and 10 will be substantially equal. If, however, variations in the magnetic properties of the sample 1 occur, the effect on the induced E. M. F. will at once be apparent. Such variations may for example be shown by a suitable indicating device connected in series with the windings 5 and 10 arranged to oppose each other. In accordance with our invention we provide means for automatically marking the sample at the approximate points at which such variations occur. The marking device we have shown at 14 is arranged to be moved into contact with the material 1 by means of the spring 15 but normally held out of contact by the solenoid 16. The apparatus and circuit connections by which this solenoid is operated will now be described.

The saturable core transformer 17 has one winding 18 connected in series with the rectifier 19 and the windings 5 and 10, these windings being arranged to oppose each other. The other winding 20 of transformer 17 forms with the resistance 21 a potentiometer across which is connected the leads 22 connecting with a suitable source of alternating current which, for example may be the source to which the leads 12 connect. The terminals of the winding 20 and resistance 21 are indicated at 23, 24 and 25. When in response to variations in the magnetic properties of the material 1 the voltage applied to the winding 18 varies in average rectified value, the degree of saturation in the core of the transformer 17 varies and the voltage distribution across the potentiometer varies. Connected to the terminals 23 and 24 of the winding 20 is the non-linear circuit which includes the saturable core reactor 27, resistance 28 and capacitance 29. The solenoid 16 by which the marker 14 is operated is connected across the capacitance 29.

The relation of the voltage $E_c$ across the capacitance 29 to the current $I_{18}$ in the winding 18 is represented by the curve A in Fig. 2. If desired, the non-linear circuit may be connected to the terminals 24 and 25 across the resistance 21 instead of across the winding 20. When so connected the relation of the voltage across the capacitance 29 to the current in the coil 18 will be as shown by the curve B of Fig. 2.

The operation of the apparatus will be clear from the above description and drawing. As long as the material being tested exhibits a magnetic property which does not differ from that of the standard more than a predetermined amount corresponding with the initial straight portions of curve A, the marking device is held by the solenoid out of contact with the material. However, when that difference exceeds the predetermined amount corresponding with the point of sudden drop of curve A the marking device is released and becomes effective to mark the material. Obviously if the non-linear circuit is connected across resistance 21, the marking device will be constructed to operate in the reverse manner since curve B is the reverse of curve A.

We have chosen the particular embodiment described above as illustrative of our invention and it will be apparent that various other modifications may be made without departing from the spirit and scope of our invention which modifications we aim to cover by the appended claims.

What we claim as new and desire to secure by Letters Patent of the United States, is:

1. Testing apparatus comprising a core structure having primary and secondary windings associated therewith, primary and secondary windings adapted to be associated with the material to be tested, means for moving the material relative to the windings associated therewith, and a device including a non-linear circuit whose condition is responsive to a difference in the voltages induced in said secondary windings.

2. Testing apparatus comprising a core structure having primary and secondary windings associated therewith, primary and secondary windings having a magnetic circuit adapted to include the material to be tested, means for moving the material relative to the windings associated with the material to be tested, means for connecting the primary windings to a source of alternating current, means for connecting the secondary windings to oppose each other and a device including a non-linear circuit connected with said secondary windings to be responsive to the potential difference thereof.

3. Testing apparatus comprising a core structure having primary and secondary windings associated therewith, primary and secondary windings having a magnetic circuit adapted to include the material to be tested, means for continuously moving the material relative to the latter windings, means for connecting the primary windings to a source of alternating current, means including a non-linear circuit for marking said material and means responsive to the difference in the voltages induced in said secondary windings for controlling the condition of said non-linear circuit.

4. Testing apparatus comprising a core structure, means for producing a varying flux therein, means arranged to produce a varying flux in the material to be tested, windings interlinking the flux paths respectively of said core and said material, a rectifier, a saturable core transformer having its primary connected with said rectifier and said windings, means for supplying alternating current to the secondary of the transformer, a non-linear circuit connected with said secondary and a current responsive device connected with said circuit.

5. Testing apparatus comprising generating windings arranged to interlink respectively the paths of flux produced in the material to be tested and in a standard material, a saturable core transformer, a rectifier connected in series with the said windings and the primary of the transformer, a non-linear circuit including a saturable core reactor connected with the secondary of the transformer, means for connecting said circuit with a source of alternating current and a current responsive device connected with said circuit.

6. Testing apparatus comprising generating windings arranged to interlink respectively the paths of flux produced in the material to be tested and in a standard material, a saturable core transformer, a rectifier connected in series with the said windings and the primary of the transformer, a circuit connected to the secondary of the transformer including a saturable core reactor, a resistance and a capacitance, means for exciting said circuit with alternating current and a current responsive device connected with said circuit.

7. Testing apparatus comprising generating windings arranged to interlink respectively the paths of flux produced in the material to be tested and in a standard material, a saturable core transformer, a rectifier connected in series with the said windings and the primary of the transformer, a source of alternating current and a non-linear circuit connected with the secondary of the transformer, and means for marking the material being tested connected with said circuit.

8. Testing apparatus comprising generating windings arranged to interlink respectively the paths of flux produced in the material to be tested and in a standard material, a saturable core transformer, a rectifier connected in series with the said windings and the primary of the transformer, a source of alternating current and a non-linear circuit including a saturable core reactor, a resistance and a capacitance connected across the secondary of said transformer, and a marking device for the material being tested connected across said capacitance.

CHAUNCEY G. SUITS.
ALBERT W. HULL.